Nov. 24, 1959 W. G. PRICE 2,914,727
METHOD AND APPARATUS FOR MEASURING MAGNETIC FIELDS
Filed April 4, 1957 2 Sheets-Sheet 1
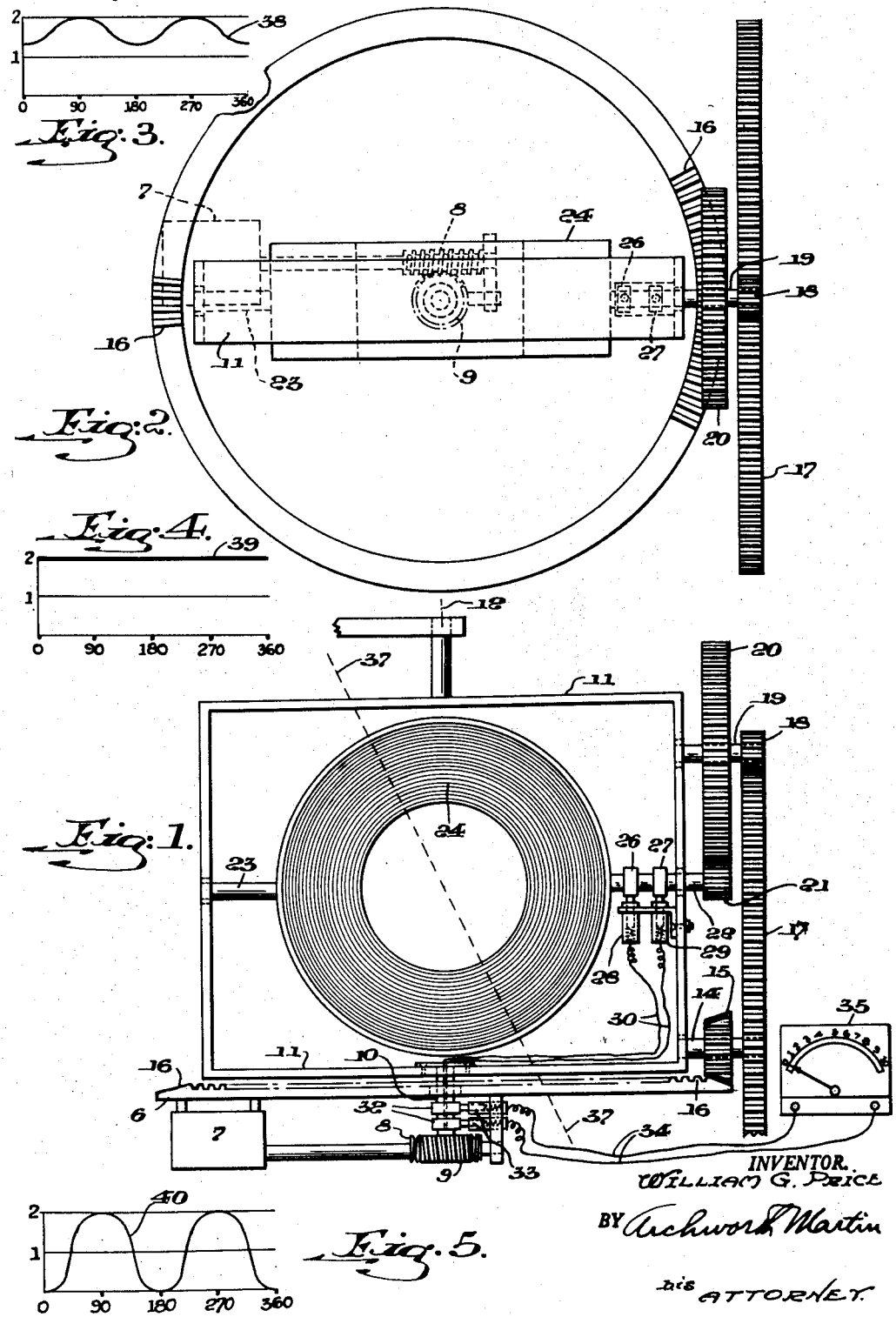
INVENTOR.
WILLIAM G. PRICE
BY Archworth Martin
his ATTORNEY.

Nov. 24, 1959    W. G. PRICE    2,914,727
METHOD AND APPARATUS FOR MEASURING MAGNETIC FIELDS
Filed April 4, 1957    2 Sheets-Sheet 2
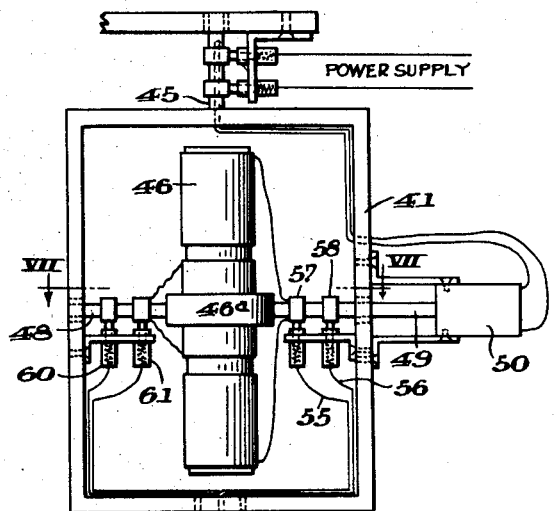
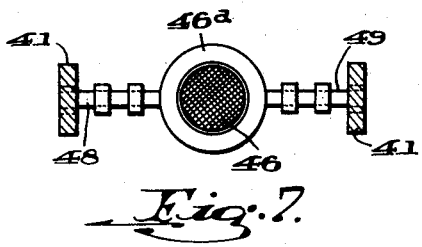
Fig. 7.
Fig. 6.
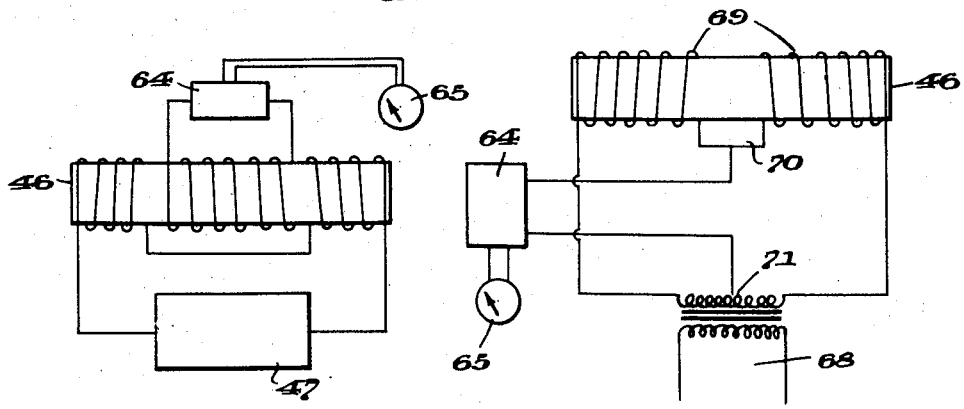
Fig. 8.
Fig. 9.
INVENTOR.
WILLIAM G. PRICE.
BY Archibald Martin
his ATTORNEY.

United States Patent Office

2,914,727
Patented Nov. 24, 1959

2,914,727

METHOD AND APPARATUS FOR MEASURING MAGNETIC FIELDS

William G. Price, New Cuyama, Calif.

Application April 4, 1957, Serial No. 650,601

6 Claims. (Cl. 324—43)

My invention relates to magnetic flux meters and more particularly to a meter which will measure or indicate slight changes in the earth's magnetic field, even at various positions of the instrument relative to the direction of the field.

My invention has for its object the provision of a means for so mounting and moving a coil in the earth's magnetic field that during each cycle of movement or movements, the measuring instrument will show the maximum current that is generated in the coil during each cycle. Briefly stated, my invention in one form employs a coil of some thousands of turns of fine wire in which alternating current will be produced during rotation of the coil in a magnetic field and particularly in the earth's magnetic field. Also, I may employ a flux indicator of the saturated coil type.

In either case, I rotate the coil about two axes that are perpendicular to each other, the rotation of the coil about one axis being quite rapid relative to the rate of rotation about the other axis.

As shown in the accompanying drawing:

Figure 1 is an elevational view of the apparatus for revolving the coil about two axes.

Fig. 2 is a plan view of a portion of the apparatus of Fig. 1.

Fig. 3 is a diagrammatic view showing a typical curve line of current produced by the coil when rotating it about one axis.

Fig. 4 shows a straight line curve of current that may be produced when the coil is rotating about another axis.

Fig. 5 is a typical curve of current fluctuation during rotation about still another axis.

Fig. 6 shows a modification of the structure of Fig. 1.

Fig. 7 is a view taken on the line 7—7 of Fig. 6.

Fig. 8 is a wiring diagram of the portion of the system of Fig. 6.

Fig. 9 shows a modification of the instrument of Fig. 6, with special reference to changes on the wiring.

Referring first to Figs. 1 and 2, a stationary base 6 is provided with a motor 7 which will preferably be driven by compressed air but could be a low-voltage electrically driven motor, if it were well shielded with soft iron or other highly permeable material that would minimize interference with the current produced in the coil.

The motor 7, through a worm 8, drives a gear wheel 9 that is secured to a shaft 10 that is secured to a frame 11, so that the frame 11 will be slowly rotated during operation of the motor. This rotation could suitably be at about 30 to 60 r.p.m., about the axis 12, which is coincident with the axis of the shaft 10. The frame 11 rotatably supports a shaft 14 that has secured thereto a beveled pinion 15, which meshes with a circular rack 16 on the base 6. This shaft 14 has also secured thereto a gear wheel 17 that drives a gear wheel 18 which is secured to a shaft 19 journaled in the frame 11. The shaft 19 has secured thereto a gear wheel 20 that drives a gear wheel 21 that is mounted on a shaft 22 that, together with a shaft 23 is rotatable in the frame and carries a coil 24 which has some thousand turns of fine wire in which a current flow will be generated during rotation of the coil about the axis at 22—23. The size of the gear wheel is such that the rotation of the coil 24 about its axis 22—23 is perhaps one thousand revolutions per minute as compared to the 30 to 60 revolutions on its axis 12.

Commutator rings 26 and 27 are respectively electrically connected to the ends of the wire that forms the coil 24, and rotate with the shaft 22. Brushes 28 and 29 respectively engage the rings 26 and 27, to maintain electrical contact during rotation of the coil on its axis 22—23. The brushes 28 and 29 are connected to conductors 30 that are carried by the frame 11 and rotate therewith. These conductors are respectively connected to commutator rings 32 carried by the shaft 10, that engage with brushes 33 which, through conductors 34 have connection with a measuring instrument such as an A.C. milliammeter 35 that will show the value of the current produced during rotation of the coil.

By reason of the rotation of the coil about the axis 12, as well as about the axis 22—23, a maximum current value will be produced at 35 during each cycle of movement of the frame 11 on the axis 12, at any position of the instrument as a whole. Thus, if the instrument is positioned in such a way that the flux lines of the field pass therethrough on the line 37—37 (Fig. 1), the current produced during each revolution of the frame on the axis 12 would be somewhat like that indicated by the curve 38 in Fig. 3.

On the other hand, if the instrument is so positioned that the lines of force are common to the axis 12, the current would be of a constant value, as indicated by the line 39 in Fig. 4. Again, if the lines of force of the magnetic field are common to the axis 22—23, we will have a curve somewhat like 40 in Fig. 5. That is to say, as the frame 11 rotates through 360 degrees on the axis 12, the current flow will go from zero to a maximum, then back to zero and again to maximum and back to zero.

With a constant field and the motor at a fixed speed, the maximum current generated during rotation of the frame through 360 degrees will be uniform. This eliminates the necessity of using gyros or other complex flux meters to maintain the instrument in one position relative to the field that is to be determined or measured.

While the apparatus described above is quite suitable for my purpose, the inventive concept will apply also to flux meters of other types, such as that hereinafter described.

Referring now to Figs. 6, 7 and 8, I show an arrangement wherein a saturated coil type of flux indicator is rotated about two axes, in the earth's magnetic field, in a manner similar to that in which the coil of Figs. 1 and 2 is rotated. In this form of invention, the saturated coil may suitably be of the type disclosed in U.S. Letters Pat. 2,555,209 or disclosed in the government publication of the National Defense Research Committee, entitled "Saturated-Core Magnetometer, NA–120, Air-Borne Instruments Laboratory, Mineola, New York," dated May 16, 1945.

In this form of the invention, as in Figs. 1 and 2, a frame 41 is slowly rotated by a motor 42, through a belt drive 43, about the axis of shafts 44 and 45 that support the frame. The motor 42 is preferably driven by compressed air rather than electricity, to reduce interference in the flow of electrical current. A saturated coil 46 may suitably comprise a coil that is wound on a core of some highly permeable material such as "Permalloy" of "mumetal," the core of the coil being made up of a bundle of thin strips of the material. The coil consists of a primary winding of a possibly 4000 turns, half of which are wound in one direction and the other half in the opposite direction. This coil is connected to an oscillating or varying current source that is indicated at 47.

The coil 46 is supported by a collar 46a on shafts 48 and 49 that are journaled in the frame 41 which also carries a motor 50 that rotates the shafts and the coil, at perhaps 1000 revolutions to each revolution of the frame 41 on its axis 44—45. The motor 50 may be air driven or electrically driven, in which latter case, it would be shielded, unless it was placed at a considerable distance from the coil. Electrical current from the oscillator 47 is conducted through brushes 51 and 52 and conductor rings 53 and 54 respectively, thence through wires 55 and 56 and commutators 57 and 58, to the two primary windings of the coil 46.

When the longitudinal axis of the coil 46 is parallel to the flux lines of the earth's field, the field strength will be indicated by a current in the secondary windings of the coil, which current is transmitted through commutator brushes at 60 and 61 to commutator brushes 62 and 63 and thence to an amplifier 64 and a meter 65.

In operation, the saturated core will respond under rotative movements in substantially the same manner as the revolving coil of Figs. 1 and 2. That is, as the coil 46 revolves on its axis 48—49, the current in the secondary coil will go from maximum to a minimum and then in the opposite polarity to a maximum and a minimum, and back to the original polarity. In other words, there would be an alternating current which is maximum when the axis 48—49 is perpendicular to the earth's field. As the frame 41 rotates about the axis 44—45, the maximum reading indicates the field strength.

The rotation on the axis 48—49 is of much greater rapidity than the rotation on the axis 44 and 45 as above mentioned, in order that the field can be sampled at each point in the cycle of slow rotation.

Fig. 9 is a wiring diagram of a somewhat different type of saturated coil magnetometer, in that no secondary coil is used, but only a bridge circuit that employs an oscillating input circuit at 68 and coil windings 69 whereby the difference in potential as between the points 70 and 71 is registered or indicated through the amplifier 64 at the meter 65.

While in the case of Figs. 1 and 2, the primary movement of the coil about the axis 22—23 is at a constant rate of rotation, as distinguished from oscillatory movement, the rotative movement about axis 12 could be oscillatory if the oscillations were through at least 180 degrees.

In the saturated coil type of Figs. 6 to 9, the revolutions about each axis could be oscillatory through 360 degrees about the axis 49—48 and at least 180 degrees about the frame axis 45—44.

Therefore, the term "rotating" in the claims does not necessarily imply a constant succession of rotative travel in the same direction, nor does the term "transverse axis" mean that the axes must necessarily intersect each other.

I claim as my invention:

1. The method of measuring changes in the earth's total magnetic field, at various positions of a measuring instrument relative to the direction of the field, which comprises producing a flow of electrical current in a coil by rotating the same at a sufficiently rapid and constant rate in the said field, about a given axis, simultaneously rotating the coil about an axis transverse to the other axis, and utilizing said current to produce an indication of maximum values of current flow, while the coil is rotating about said axes.

2. The method of measuring changes in the earth's total magnetic field, at various positions of a measuring instrument relative to the direction of the field, which comprises rotating an electrically-conductive coil in said field, at such rate about a diametral axis as to produce a measurable flow of electrical current therein, simultaneously rotating the coil at a relatively slow rate about an axis transverse to the first named axis, and producing an indication of the maximum values in current flow while the coil is rotating about said axes.

3. The method as recited in claim 1, wherein, the coil is of the saturated core type.

4. The method of measuring changes in the earth's total magnetic field, at various positions of a measuring instrument relative to the direction of the field, which comprises rotating a magnetic flux-measuring instrument in said field about a given axis, simultaneously imparting rotative movement to the instrument through a range of at least 180 degrees about an axis transverse to said given axis, and utilizing the maximum flux indication to indicate field strength while the instrument is being turned on said axes.

5. A magnetometer that comprises a coil of turns of wire wrapped in relatively superposed relation in such number that an appreciable electrical current flow will be produced in the coil when it is rotated about a diametral axis in a magnetic field, a frame that rotatably supports the coil on said axis, means for rotatably supporting the said frame on an axis transverse to the first-named axis, a ring gear co-axial with the second-named axis, a gear train carried by said frame in position to be driven by the said ring gear during rotation of the frame and having driving connection with a shaft that supports the coil for rotation on the first axis, and means for conducting electrical current from the terminals of the coil to a measuring instrument, during rotation of the coil and the frame.

6. A magnetometer as recited in claim 5, wherein the electrical conducting means comprises commutator members at the first named axis electrically connected to commutator members at the second named axis, and conductors leading from the last named commutator members.

References Cited in the file of this patent

UNITED STATES PATENTS

| | | |
|---|---|---|
| 2,468,554 | Hull | Apr. 26, 1949 |
| 2,564,854 | Muffly | Aug. 21, 1951 |
| 2,659,859 | Heiland | Nov. 17, 1953 |